US012615628B2

(12) United States Patent
Ali et al.

(10) Patent No.: US 12,615,628 B2
(45) Date of Patent: Apr. 28, 2026

---

(54) REQUESTING A WAVEFORM CHANGE

(71) Applicant: Lenovo (Singapore) Pte. Ltd., New Tech Park (SG)

(72) Inventors: Ali Ramadan Ali, Kraiburg am Inn (DE); Karthikeyan Ganesan, Kronberg im Taunus (DE); Ankit Bhamri, Rödermark (DE); Alexander Johann Maria Golitschek Edler von Elbwart, Darmstadt (DE); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 446 days.

(21) Appl. No.: 18/013,158

(22) PCT Filed: Jun. 25, 2021

(86) PCT No.: PCT/IB2021/055713
§ 371 (c)(1),
(2) Date: Dec. 27, 2022

(87) PCT Pub. No.: WO2021/260655
PCT Pub. Date: Dec. 30, 2021

(65) Prior Publication Data
US 2023/0337200 A1     Oct. 19, 2023

Related U.S. Application Data

(60) Provisional application No. 63/044,766, filed on Jun. 26, 2020.

(51) Int. Cl.
*H04W 72/04*     (2023.01)
*H04L 5/00*     (2006.01)
(Continued)

(52) U.S. Cl.
CPC ....... *H04W 72/0453* (2013.01); *H04L 5/0092* (2013.01); *H04W 72/02* (2013.01); *H04W 74/0833* (2013.01); *H04W 74/0836* (2024.01)

(58) Field of Classification Search
CPC ............. H04W 72/0453; H04W 72/02; H04W 74/0833; H04L 5/0092
See application file for complete search history.

(56) References Cited

U.S. PATENT DOCUMENTS

| | | | |
|---|---|---|---|
| 9,847,897 B1 | 12/2017 | Cheng et al. | |
| 2017/0127435 A1 | 5/2017 | Rong et al. | |

(Continued)

OTHER PUBLICATIONS

PCT/IB2021/055713, "Notification of Transmittal of the International Search Report and the Written Opinion of the International Searching Authority, or the Declaration", International Searching Authority, Sep. 24, 2021, pp. 1-15.

(Continued)

*Primary Examiner* — Brenda H Pham
(74) *Attorney, Agent, or Firm* — Kunzler Needham & Hilton

(57) ABSTRACT

Apparatuses, methods, and systems are disclosed for requesting a waveform change. One method includes receiving, at a user equipment, first information indicating configurations for a plurality of waveforms and an indication indicating that the user equipment is enabled to request a waveform change, a subcarrier spacing change, or a combination thereof. The method includes transmitting a request message to a base station. The request message requests the waveform change, the subcarrier spacing change, or the combination thereof. The method includes receiving a response message from the base station. The response message indicates whether the request for the waveform change, the subcarrier spacing change, or the combination thereof is approved.

18 Claims, 7 Drawing Sheets

(51) Int. Cl.
| | |
|---|---|
| *H04W 72/02* | (2009.01) |
| *H04W 72/0453* | (2023.01) |
| *H04W 74/0833* | (2024.01) |
| H04W 74/0836 | (2024.01) |

(56) References Cited

U.S. PATENT DOCUMENTS

| | | | |
|---|---|---|---|
| 2018/0287840 A1 | 10/2018 | Akkarakaran et al. | |
| 2018/0294916 A1* | 10/2018 | Akkarakaran | ........ H04L 5/0092 |
| 2019/0173701 A1 | 6/2019 | Ma et al. | |
| 2019/0261315 A1 | 8/2019 | Zhang et al. | |
| 2019/0380144 A1 | 12/2019 | Luo et al. | |
| 2020/0053730 A1 | 2/2020 | Hosseini et al. | |

OTHER PUBLICATIONS

3GPP, "3rd Generation Partnership Project; Technical Specification Group Radio Access Network; Study on requirements for NR beyond 52.6 GHz (Release 16)", 3GPP TR 38.807 V16.0.0, Dec. 2019, pp. 1-68.

3GPP, "3rd Generation Partnership Project; Technical Specification Group Radio Access Network; NR; Physical channels and modulation (Release 16)", 3GPP TS 38.211 V16.1.0, Mar. 2020, pp. 1-130.

3GPP, "3rd Generation Partnership Project; Technical Specification Group Radio Access Network; NR; Physical layer procedures for control (Release 16)", 3GPP TS 38.213 V16.1.0, Mar. 2020, pp. 1-156.

* cited by examiner

200

300

400

402

404

406

408

412

416

420

424

428

600

```
                          ╭─────────╮
                          │  Begin  │
                          ╰─────────╯
                               │
                               ▼
        ┌──────────────────────────────────────────────┐
        │  Receive, At A User Equipment, First          │
        │  Information Indicating Configurations For A   │
        │  Plurality Of Waveforms And An Indication      │
  602   │  Indicating That The User Equipment Is         │
        │  Enabled To Request A Waveform Change, A       │
        │  Subcarrier Spacing Change, Or A Combination   │
        │  Thereof                                       │
        └──────────────────────────────────────────────┘
                               │
                               ▼
        ┌──────────────────────────────────────────────┐
        │  Transmit A Request Message To A Base          │
        │  Station, Wherein The Request Message          │
  604   │  Requests The Waveform Change, The             │
        │  Subcarrier Spacing Change, Or The             │
        │  Combination Thereof                           │
        └──────────────────────────────────────────────┘
                               │
                               ▼
        ┌──────────────────────────────────────────────┐
        │  Receive A Response Message From The Base      │
        │  Station, Wherein The Response Message         │
  606   │  Indicates Whether The Request For The         │
        │  Waveform Change, The Subcarrier Spacing       │
        │  Change, Or The Combination Thereof Is         │
        │  Approved                                      │
        └──────────────────────────────────────────────┘
                               │
                               ▼
                          ╭─────────╮
                          │   End   │
                          ╰─────────╯
```

Begin

702 ⌇ Transmit, From A Base Station, First Information Indicating Configurations For A Plurality Of Waveforms And An Indication Indicating That A User Equipment Is Enabled To Request A Waveform Change, A Subcarrier Spacing Change, Or A Combination Thereof 704 ⌇ Receive A Request Message From The User Equipment, Wherein The Request Message Requests The Waveform Change, The Subcarrier Spacing Change, Or The Combination Thereof 706 ⌇ Transmit A Response Message To The User Equipment, Wherein The Response Message Indicates Whether The Request For The Waveform Change, The Subcarrier Spacing Change, Or The Combination Thereof Is Approved End

FIG. 7

REQUESTING A WAVEFORM CHANGE

CROSS-REFERENCE TO RELATED APPLICATIONS

This application claims priority to U.S. Patent Application Ser. No. 63/044,766 entitled "APPARATUSES, METHODS, AND SYSTEMS FOR WAVEFORM INDICATION DURING INITIAL ACCESS" and filed on Jun. 26, 2020 for Ali Ramadan Ali, which is incorporated herein by reference in its entirety.

FIELD

The subject matter disclosed herein relates generally to wireless communications and more particularly relates to requesting a waveform change.

BACKGROUND

In certain wireless communications networks, different waveforms may be used for communication. Certain waveforms may be better than others depending on various criteria.

BRIEF SUMMARY

Methods for requesting a waveform change are disclosed. Apparatuses and systems also perform the functions of the methods. One embodiment of a method includes receiving, at a user equipment, first information indicating configurations for a plurality of waveforms and an indication indicating that the user equipment is enabled to request a waveform change, a subcarrier spacing change, or a combination thereof. In some embodiments, the method includes transmitting a request message to a base station. The request message requests the waveform change, the subcarrier spacing change, or the combination thereof. In certain embodiments, the method includes receiving a response message from the base station. The response message indicates whether the request for the waveform change, the subcarrier spacing change, or the combination thereof is approved.

One apparatus for requesting a waveform change includes a user equipment. In some embodiments, the apparatus includes a receiver that receives first information indicating configurations for a plurality of waveforms and an indication indicating that the user equipment is enabled to request a waveform change, a subcarrier spacing change, or a combination thereof. In various embodiments, the apparatus includes a transmitter that transmits a request message to a base station. The request message requests the waveform change, the subcarrier spacing change, or the combination thereof. The receiver receives a response message from the base station. The response message indicates whether the request for the waveform change, the subcarrier spacing change, or the combination thereof is approved.

Another embodiment of a method for responding to a request for a waveform change includes transmitting, from a base station, first information indicating configurations for a plurality of waveforms and an indication indicating that a user equipment is enabled to request a waveform change, a subcarrier spacing change, or a combination thereof. In some embodiments, the method includes receiving a request message from the user equipment. The request message requests the waveform change, the subcarrier spacing change, or the combination thereof. In certain embodiments, the method includes transmitting a response message to the user equipment. The response message indicates whether the request for the waveform change, the subcarrier spacing change, or the combination thereof is approved.

Another apparatus for responding to a request for a waveform change includes a base station. In some embodiments, the apparatus includes a transmitter that transmits first information indicating configurations for a plurality of waveforms and an indication indicating that a user equipment is enabled to request a waveform change, a subcarrier spacing change, or a combination thereof. In various embodiments, the apparatus includes a receiver that receives a request message from the user equipment. The request message requests the waveform change, the subcarrier spacing change, or the combination thereof. The transmitter transmits a response message to the user equipment. The response message indicates whether the request for the waveform change, the subcarrier spacing change, or the combination thereof is approved.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6 is a flow chart diagram illustrating one embodiment of a method for requesting a waveform change; and FIG. 7 is a flow chart diagram illustrating one embodiment of a method for responding to a request for a waveform change.

DETAILED DESCRIPTION

Figure 1:
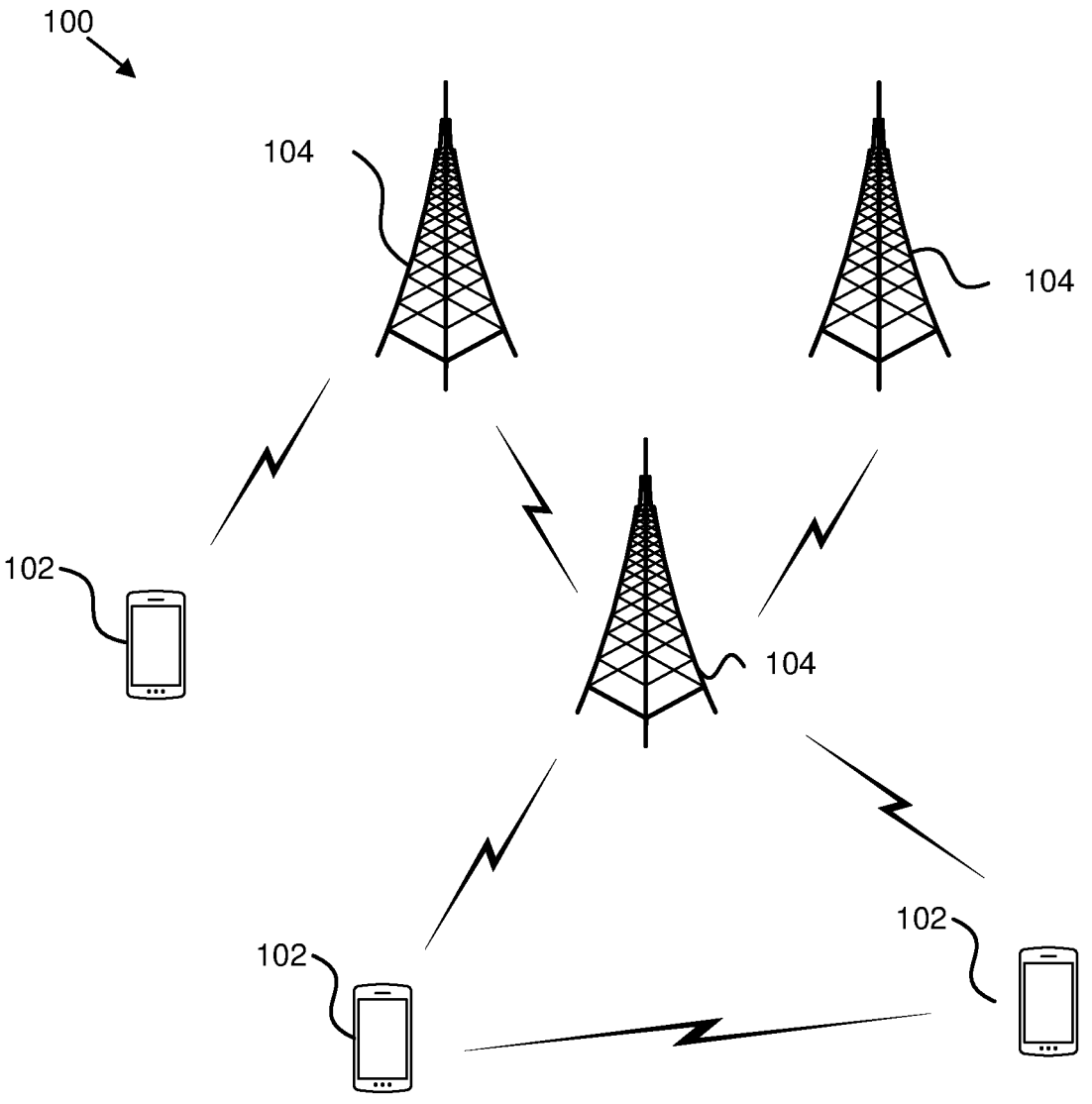
FIG. 1 is a schematic block diagram illustrating one embodiment of a wireless communication system for requesting a waveform change.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data maybe identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (anon-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for requesting a waveform change. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive, at a user equipment, first information indicating configurations for a plurality of waveforms and an indication indicating that the user equipment is enabled to request a waveform change, a subcarrier spacing change, or a combination thereof. In some embodiments, the remote unit 102 may transmit a request message to a base station. The request message requests the waveform change, the subcarrier spacing change, or the combination thereof. In certain embodiments, the remote unit 102 may receive a response message from the base station. The response message indicates whether the request for the waveform change, the subcarrier spacing change, or the combination thereof is approved. Accordingly, the remote unit 102 may be used for requesting a waveform change.

In certain embodiments, a network unit 104 may transmit, from a base station, first information indicating configurations for a plurality of waveforms and an indication indicating that a user equipment is enabled to request a waveform change, a subcarrier spacing change, or a combination thereof. In some embodiments, the network unit 104 may receive a request message from the user equipment. The request message requests the waveform change, the subcarrier spacing change, or the combination thereof. In various embodiments, the network unit 104 may transmit a response message to the user equipment. The response message indicates whether the request for the waveform change, the subcarrier spacing change, or the combination thereof is approved. Accordingly, the network unit 104 may be used for responding to a request for a waveform change.

Figure 2:
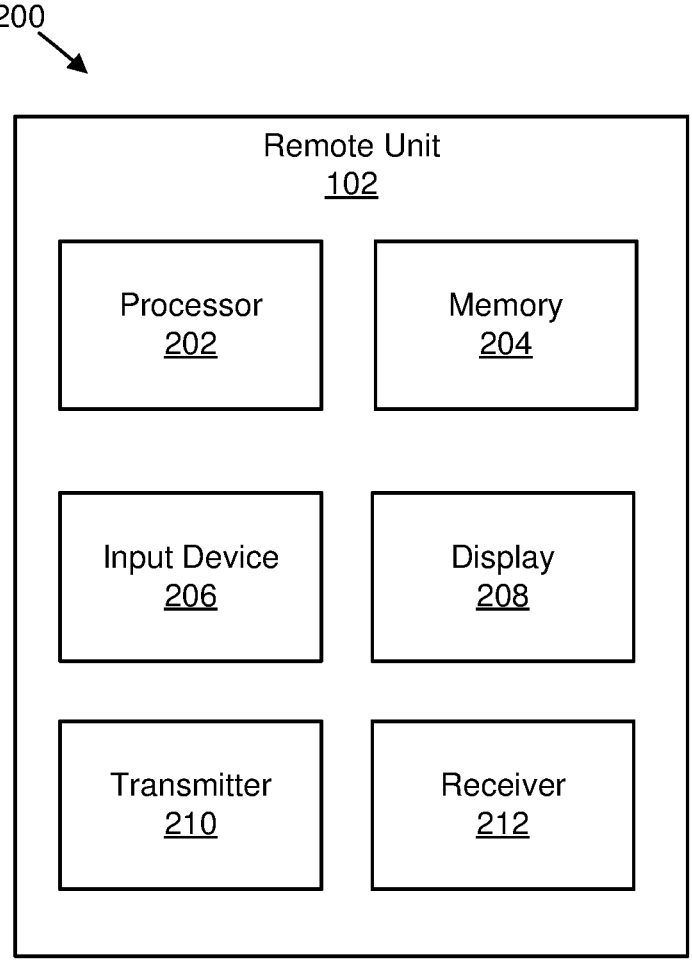
FIG. 2 is a schematic block diagram illustrating one embodiment of an apparatus that may be used for requesting a waveform change.

FIG. 2 depicts one embodiment of an apparatus 200 that may be used for requesting a waveform change. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The receiver 212 may receive first information indicating configurations for a plurality of waveforms and an indication indicating that the user equipment is enabled to request a waveform change, a subcarrier spacing change, or a combination thereof. In various embodiments, the transmitter 210 may transmit a request message to a base station, wherein the request message requests the waveform change, the subcarrier spacing change, or the combination thereof, wherein the receiver receives a response message from the base station, wherein the response message indicates whether the request for the waveform change, the subcarrier spacing change, or the combination thereof is approved.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
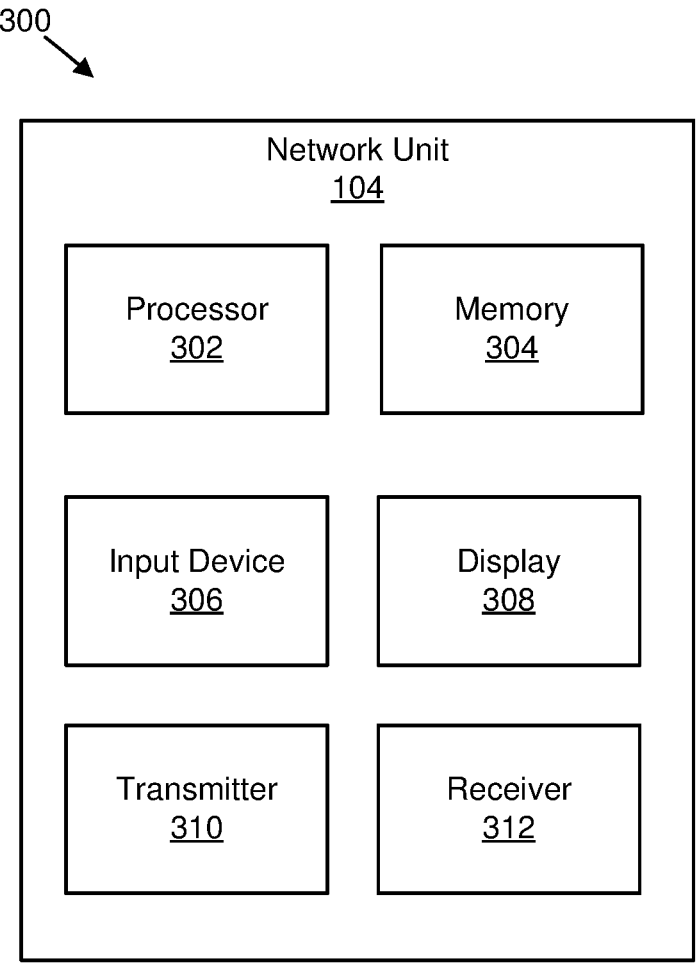
FIG. 3 is a schematic block diagram illustrating one embodiment of an apparatus that may be used for responding to a request for a waveform change.

FIG. 3 depicts one embodiment of an apparatus 300 that may be used for responding to a request for a waveform change. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 maybe substantially similar to the processor 202, the memory 204, the input device 206, the display 208, the transmitter 210, and the receiver 212 of the remote unit 102, respectively.

In certain embodiments, the transmitter 310 may be used for transmitting information described herein and/or the receiver 312 may be used for receiving information described herein.

The transmitter 310 may transmit first information indicating configurations for a plurality of waveforms and an indication indicating that a user equipment is enabled to request a waveform change, a subcarrier spacing change, or a combination thereof. In certain embodiments, the receiver 312 may receive a request message from the user equipment. The request message requests the waveform change, the subcarrier spacing change, or the combination thereof. In various embodiments, the transmitter 310 transmits a response message to the user equipment. The response message indicates whether the request for the waveform change, the subcarrier spacing change, or the combination thereof is approved.

In certain embodiments, new radio ("NR") beyond 52.6 GHz may be used. In such embodiments, there may be signal degradation at high frequencies. Moreover, at such frequencies, in addition to a high path loss, radio frequency ("RF") components of a transmitter and a receiver may exhibit nonlinear transfer characteristics which may lead to further system degradation.

In some embodiments, multi-carrier orthogonal frequency division multiplexing ("OFDM") based waveform may be used for downlink ("DL") and/or uplink ("UL"). In various embodiments, such as at a cell edge, single carrier discrete Fourier transform ("DFT") spread OFDM ("DFT-s-OFDM") may be used in UL. In certain embodiments, cyclic prefix ("CP") OFDM ("CP-OFDM") performance degrades at high frequencies (e.g., 52.6 GHz) due to its sensitivity to phase noise and its high peak to average power ratio ("PAPR") or cubic metric ("CM") that limits cell coverage. It should be noted that, degradation of CP-OFDM at high frequencies may become severe as a modulation order and/or a channel bandwidth increases. Therefore, some physical layer channels may be affected more than others.

Because of various described embodiments, a single carrier waveform may be a suitable candidate at high frequencies due to its natural robustness against phase noise and its low PAPR or CM. In some embodiments, UL supports a single carrier waveform (e.g., DFT-s-OFDM and/or single carrier ("SC") frequency division multiplexing ("FDM") ("SC-FDM")). However, a power constraint of a UE, especially at a cell edge, may necessitates enhancement of UL as well by adopting other single carrier waveforms such as SC quadrature amplitude modulation ("QAM") ("SC-QAM"), SC frequency domain equalization ("FDE") ("SC-FDE"), and or CP SC ("CP-SC") for cell edge conditions.

In various embodiments, single carrier waveforms, such as a DFT-s-OFDM waveform, may be used for DL due to its low PAPR compared with CP-OFDM and its better frequency flexibility compared with pure single carrier candidates such as SC-QAM. In certain embodiments, although using DFT-s-OFDM or other single carrier candidates for DL may enhance cell coverage, it may limit the multiple input multiple output ("MIMO") capabilities of a system and may reduce the flexibility of demodulation reference signal ("DMRS") mapping. In some embodiments, frequency range 4 ("FR4") may be used for high data rate applications such as enhanced mobile broadband ("eMBB") and may require high channel bandwidth for high throughput, and MIMO may also can play an important rule. In various embodiments, such as in factory automation and/or industrial internet of things ("IoT") ("IIoT") applications, a latency and/or massive access and reliability may be important. In certain embodiments, such as backhauling, integrated access backhaul ("IAB") may work mostly under line of sight ("LOS") conditions, where a fading and power consumption may not be a major issue. In some embodiments, mobile data offloading may require coexistence with other systems (e.g., Wi-Fi at 60 GHz). In various embodiments, for short-range high-data rate device to device ("D2D") communications, a coverage may be limited and a PAPR problem may be less critical than other issues. In certain embodiments, a trade-off between cell coverage requirements and quality of service ("QoS") requirements in terms of latency and throughput may be considered to support different configurations. In some embodiments, multi waveform support for DL and UL is a practical solution to accommodate variant configurations and/or coverages to enable high system flexibility and optimize performance. In various embodiments, a user equipment ("UE") preferred DL and/or UL waveform and/or the numerology may be indicated during a random access channel ("RACH") procedure.

In certain embodiments, a single carrier waveform such as DFT-s-OFDM, SC-FDE, SC-FDM, or CP-SC may have a low PAPR as comparing with OFDM and may thereby improve a coverage of a network (e.g., at a cell edge and/or at a high carrier frequency). In some embodiments, OFDM may have better support for MIMO and better spectrum efficiency as well as efficient reference signal ("RS") placement in a time-frequency grid than SC waveforms. In various embodiments, some UEs may be equipped with only one waveform for the sake of simplicity. In certain embodiments, multi waveform support for DL and UL may be provided to accommodate various configurations and/or coverages. In some embodiments, to enable high system flexibility and optimize performance in terms of coverage and throughput for different configurations, a waveform switching scheme may be used during an initial access at frequencies above 52.6 GHz for DL. In such embodiments, a gNB may switch between multi carrier and single carrier waveforms based on a request from a UE.

In various embodiments, existing baseband hardware ("HW") for a gNB and/or UE may be upgraded to support high frequencies (e.g., beyond 52.6 GHz, FR4, frequencies above 52.6 GHz). In such embodiments, HW may support both multiple and single carrier waveforms for DL and/or UL and baseband HW for the UE may support only one waveform. In certain embodiments, in addition to semi-statically configuring multiple waveforms for certain data and/or control channels, a UE may request a DL waveform type or numerology of a waveform based on its measurements of initial access signals (e.g., synchronization signal ("SS") and/or physical broadcast channel ("PBCH") blocks).

In some embodiments, a gNB selects initial waveforms to be used in different DL channels for initial access and transmits a synchronization signal block ("SSB") with a default DL waveform. The default DL waveform may be single carrier, multicarrier, or a combination of both. The default DL waveform and its corresponding numerology may be selected based on network requirements (e.g., carrier frequency, QoS, and so forth).

In various embodiments, such as for DL having multiple waveforms, a gNB may select a waveform based on parameters such as a used carrier frequency, a UE measurement (e.g., referenced signal received power ("RSRP"), reference signal received quality ("RSRQ"), signal to interference noise ratio ("SINR")), a location, UE RF capabilities, gNB RF capabilities, a UE power status (e.g., power headroom ("PH") report), UE assistance information (e.g., DL transform precoding recommendation based on a path loss ("PL") estimate), an indication of a UE battery power status, and so forth. In certain embodiments, a UE battery may help a gNB to choose a waveform because some waveforms may require higher signal processing reception complexity than others, and thus it may be important to save UE power at a critical battery power status.

In some embodiments, a UE may choose or recommend a preferred DL or UL waveform or both a preferred DL and UL waveform, and may indicate explicitly or implicitly to a gNB for a subsequent DL transmission to use the waveform during an initial access procedure based on a DL SSB measurement (e.g., based on a DL path loss, primary synchronization signal ("PSS") peak power, physical broadcast channel ("PBCH") demodulation reference signal ("DMRS") ("PBCH-DMRS") (e.g., RSRP, RSRQ, SINR), or SS-RSRP, RSRQ, and/or SINR where an explicit or implicit indication may be based on a RACH preamble selected or a message A ("MsgA") transmission along with a RACH preamble or a combination of both.

In various embodiments, a gNB may choose to transmit a beam swept SSB with multiple waveforms with a different transmission pattern and a UE may choose a DL waveform with a lowest pathloss, a pathloss below a threshold, a pathloss in a range (e.g., a threshold and/or a range may be predefined and/or configured), a highest SS-RSRP, RSRQ, and/or SINR, above a threshold, and/or in a range (e.g., threshold and/or range may be predefined and/or configured)) of SSB measurements and may indicate in various ways to the gNB.

In a first embodiment, there may be a waveform indication for 4 step RACH. In certain embodiments, such as for type-1 random-access (e.g., 4 step RACH), a physical random access control channel ("PRACH") preamble may be generated or selected with a sequence associated with a requested waveform and sent to a gNB (e.g., determining a PRACH preamble sequence based on a preferred DL waveform type). In some embodiments, a PRACH preamble may be used to indicate a preferred DL waveform type and/or a preferred UL waveform type.

In various embodiments, a UE may implicitly indicate a DL waveform to be used by a gNB in a next subsequent DL transmission (e.g., Msg 2 or Msg 4) by selecting an appropriate preamble identifier ("ID"). In certain embodiments, a gNB may configure multiple prach-RootSequenceIndex or multiple msgA-prach-RootSequenceIndex in a system information block ("SIB") (e.g., via radio resource control ("RRC") common signaling). In such embodiments, each index may be associated with a certain waveform index.

In some embodiments, a threshold of a path loss measurements at which a UE requests a change of a waveform may be signaled (e.g., in a SIB) to the UE along with a RACH RRC configuration.

In a second embodiment, there may be a waveform indication for 2 step RACH. In various embodiments, for type-2 random-access (e.g., 2 step RACH), a RACH preamble may be selected or generated and sent with a sequence associated with the waveform, or a requested DL waveform indication may be sent in a physical uplink shared channel ("PUSCH") transmission part of a MsgA.

In certain embodiments, a MsgA PUSCH payload contains a bit field (or a state in a bit field) indicating a requested DL waveform. In some embodiments, a bit field (or a state in a bit field) may be used to indicate a preferred UL waveform type and/or a preferred DL waveform type.

In various embodiments, a MsgA PUSCH DMRS may be selected or generated with a sequence associated with a requested waveform. In certain embodiments, a DMRS sequence may be used to indicate a preferred UL waveform type and/or a preferred DL waveform type.

In a third embodiment, there may be an indication of a preferred subcarrier spacing ("SCS"). In some embodiments, a UE, upon DL measurement (e.g., measuring a DL path loss a the SSB, SS-RSRP, RSRQ, and/or SINR), may indicate a preferred SCS to a gNB along with a preferred DL waveform or the UE may indicate a SCS independent of the preferred DL waveform. In various embodiments, a UE may indicate a preferred UL SCS, a preferred DL SCS, a preferred UL waveform type, and/or a preferred DL waveform type to a gNB.

In certain embodiments, an indication of a preferred SCS may be based on a threshold of a path loss measurement of SSB, SS-RSRP, RSRQ, and/or SINR signaled by a gNB. In some embodiments, a threshold could be signaled along with RACH configurations, and a UE may indicate a preferred SCS to a gNB using a PRACH preamble sequence.

In various embodiments, a PUSCH-DMRS sequence or a bit field (or a state in a bit field) in a PUSCH payload of a MsgA may indicate a preferred SCS. In certain embodiments, an indication may be a relative value that represents a delta step for increasing or decreasing a SCS. In such embodiments, '1' may indicate a request for increasing the SCS with one step up (e.g., from 240 KHz to 480 KHz), and '0' may indicate reducing the SCS one step down (e.g., from 480 KHz to 240 KHz).

In some embodiments, a UE may indicate an absolute value of a requested SCS with an index of multiple bits. In such embodiments, the gNB may acknowledge and indicate a new SCS to the UE using a random access response ("RAR") message for 4 step RACH or a message B ("MsgB") for 2 step RACH.

In a fourth embodiment, a gNB may provide a response for a waveform change request. In various embodiments, upon detecting a PRACH preamble, a gNB receives an indication of a waveform from a PRACH preamble sequence or from a MsgA PUSCH transmission. As a response to the UE, the gNB may acknowledge receiving the requested waveform using a RAR message for 4 step RACH or a MsgB, downlink control information ("DCI"), or payload for 2 step RACH. In such embodiments, the gNB may indicate or configure an application time (e.g., in terms of a number of symbols and/or slots in a reference subcarrier spacing (e.g., DL SCS, SCS used for RAR message for 4 step RACH, or MsgB DCI, or payload for 2 step RACH) if a requested or indicated waveform type (e.g., as part of the acknowledgement) will be applicable.

In certain embodiments, a gNB may use a requested waveform for a RAR or a MsgB transmission. In some embodiments, a gNB may use a default waveform for a RAR or a MsgB transmission and may indicate a slot number at which the requested waveform will be used.

In various embodiments, based on a priority or a scheduling requirements, a gNB may send in DCI, with a default waveform, an indication to a UE that a request can or cannot be met.

In the fifth embodiment, there may be a default DL waveform for all DL channels. In certain embodiments, a gNB may semi-statically indicate in RRC signaling (e.g., during or after initial access) a default DL waveform to be used for all DL channels (e.g., physical downlink control channel ("PDCCH") and/or physical downlink shared channel ("PDSCH") containing dedicated user data and/or PDSCH with higher layer signaling).

In some embodiments, RRC signaling for an PDCCH configuration may indicate a DL waveform, PDSCH-dedicated signaling may indicate a DL waveform to be used for user data, and PDSCH-common signaling may indicate the DL waveform to be used for delivering higher layer signaling.

In various embodiments, a gNB or network node may indicate that UEs supporting only a first waveform type and/or a first SCS are barred from or not recommended to access a cell. Such information may be indicated in system information ("SI") such as a physical broadcast channel ("PBCH") and/or master information block ("MIB") or first SIB ("SIB1"). In certain embodiments, a gNB may indicate a set or list of supported waveform types (e.g., for DL and/or UL) and/or a set or list of supported subcarrier spacings (e.g., for DL and/or UL) among which the UE may select a preferred waveform type and/or preferred SCS. In some embodiments, a first waveform type (or first SCS) in a list may be based on a first threshold and a second waveform type (or second SCS) in the list may be selected based on a second threshold. In such embodiments, the first threshold and the second threshold may be the same (e.g., the first waveform type (or first SCS) selected if the DL measurement is above a threshold, and the second waveform type (or second SCS) selected if the DL measurement is below a threshold).

Figure 4:
FIG. 4 is a schematic block diagram illustrating one embodiment of a signaling procedure for waveform switching request for 4-setup RACH.
Figure 4:
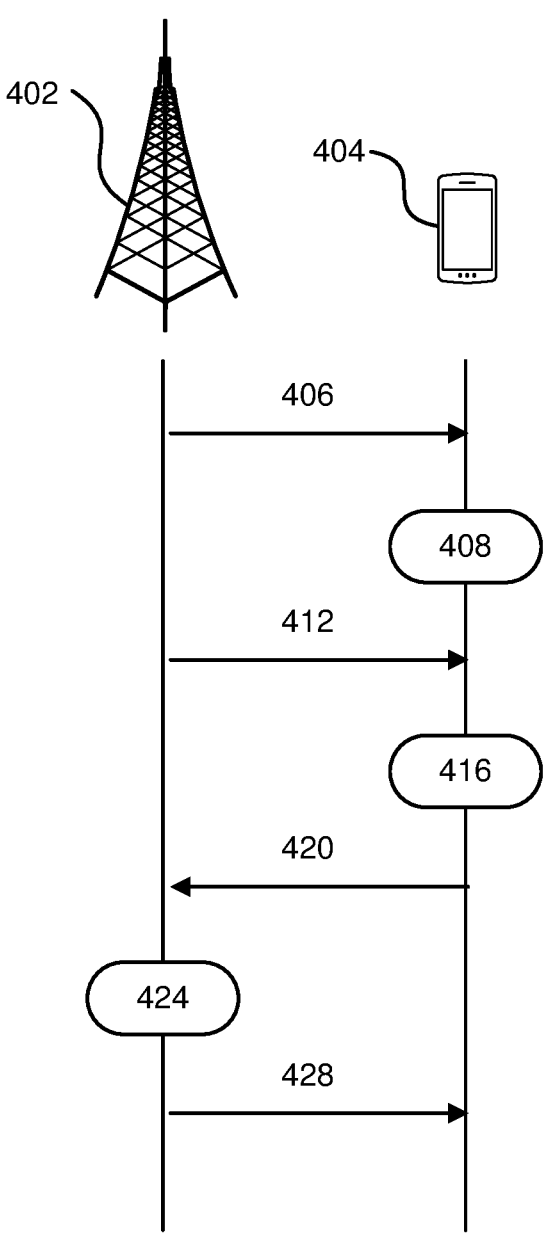

FIG. 4 is a schematic block diagram illustrating one embodiment of a signaling procedure 400 for waveform switching request for 4 step RACH. Communications are illustrated between a gNB 402 and a UE 404. Each of the communications may include one or more messages.

In a first communication 406 transmitted from the gNB 402 to the UE 404, the gNB 402 transmits an SSB and/or a default waveform to the UE 404.

The UE 404 measures 408 a pathloss of received signals (e.g., PSS peak power, PBCH DMRS-based RSRP).

In a second communication 412 transmitted from the gNB 402 to the UE 404, the gNB 402 transmits SIBs to the UE 404 (e.g., RACH configurations, configuration for waveform based ID sequence generation, pathloss threshold for waveform switching request).

The UE 404 generates 416 a PRACH preamble with a requested waveform association.

In a third communication 420 transmitted from the UE 404 to the gNB 402, the UE 404 transmits the PRACH preamble to the gNB 402 (e.g., indicating a requested waveform).

The gNB 404 evaluates 424 the request (e.g., based on QoS requirements and/or priority and scheduling requirements).

In a fourth communication 428 transmitted from the gNB 402 to the UE 404, the gNB 402 transmits a RAR to the UE 404 (e.g., indicating a response to the waveform request).

Figure 5:
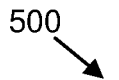
FIG. 5 is a schematic block diagram illustrating one embodiment of a signaling procedure for waveform switching request for 2-setup RACH.
Figure 5:
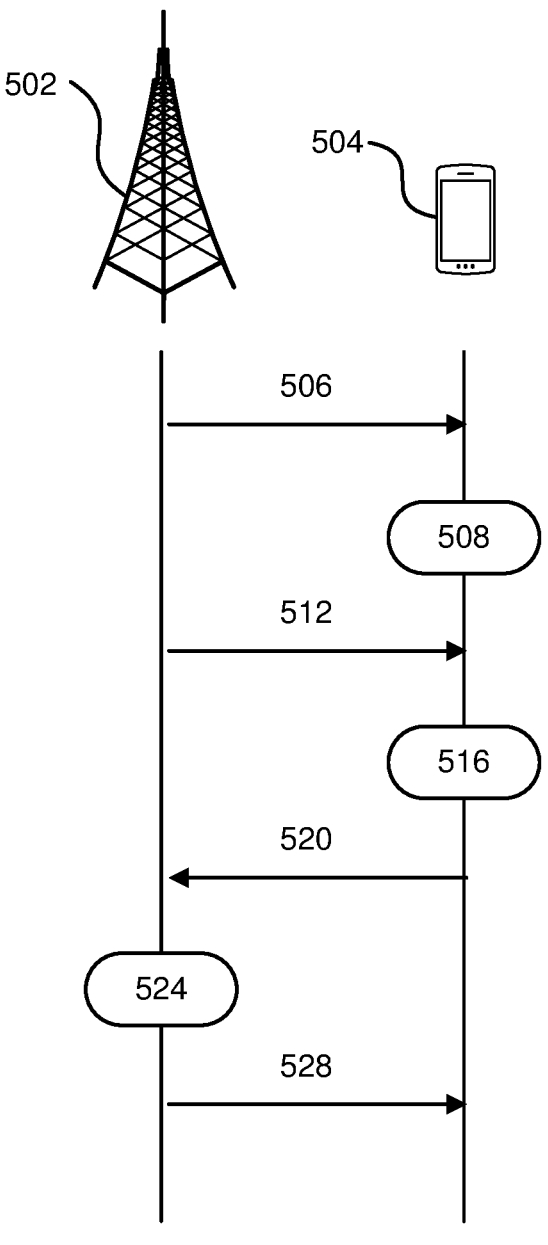

FIG. 5 is a schematic block diagram illustrating one embodiment of a signaling procedure 500 for waveform switching request for 2 step RACH. Communications are illustrated between a gNB 502 and a UE 504. Each of the communications may include one or more messages.

In a first communication 506 transmitted from the gNB 502 to the UE 504, the gNB 502 transmits an SSB and/or a default waveform to the UE 504.

The UE 504 measures 508 a pathloss of received signals (e.g., PSS peak power, PBCH DMRS-based RSRP).

In a second communication 512 transmitted from the gNB 502 to the UE 504, the gNB 502 transmits SIBs to the UE 504 (e.g., RACH configurations, configuration for waveform based ID sequence generation, pathloss threshold for waveform switching request).

The UE 504 generates 516 a MsgA with a requested waveform association.

In a third communication 520 transmitted from the UE 504 to the gNB 502, the UE 504 transmits the MsgA to the gNB 502 (e.g., indicating a requested waveform).

The gNB 504 evaluates 524 the request (e.g., based on QoS requirements and/or priority and scheduling requirements).

In a fourth communication 528 transmitted from the gNB 502 to the UE 504, the gNB 502 transmits a MsgB to the UE 504 (e.g., indicating a response to the waveform request).

FIG. 6 is a flow chart diagram illustrating one embodiment of a method 600 for requesting a waveform change. In some embodiments, the method 600 is performed by an apparatus, such as the remote unit 102. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes receiving 602, at a user equipment, first information indicating configurations for a plurality of waveforms and an indication indicating that the user equipment is enabled to request a waveform change, a subcarrier spacing change, or a combination thereof. In some embodiments, the method 600 includes transmitting 604 a request message to a base station, wherein the request message requests the waveform change, the subcarrier spacing change, or the combination thereof. In certain embodiments, the method 600 includes receiving 606 a response message from the base station, wherein the response message indicates whether the request for the waveform change, the subcarrier spacing change, or the combination thereof is approved.

In certain embodiments, the plurality of waveforms comprises an uplink waveform, a downlink waveform, a multi-carrier waveform, a single-carrier waveform, or some combination thereof. In some embodiments, the method 600 further comprises receiving second information indicating at least one waveform type that is not able to be used in a serving cell. In various embodiments, the method 600 further comprises receiving a system information block random access channel configuration comprising a mapping between a plurality of random access channel preambles and the plurality of waveforms.

In one embodiment, the method 600 further comprises receiving a plurality of random access channel root sequence indexes, wherein each sequence index of the plurality of random access channel root sequence indexes corresponds to a waveform of the plurality of waveforms. In certain embodiments, the method 600 further comprises receiving path loss information corresponding to a synchronization signal block threshold, a reference signal received power threshold, a reference signal received quality threshold, a signal to interference noise ratio threshold, or a combination thereof. In some embodiments, the method 600 further comprises triggering the request message based on the synchronization signal block threshold, the reference signal received power threshold, the reference signal received quality threshold, the signal to interference noise ratio threshold, or the combination thereof.

In various embodiments, the request message comprises a selected random access channel preamble that belongs to a root sequence index or a preamble identifier group that corresponds to the waveform change, the subcarrier spacing change, or the combination thereof.

In one embodiment, in response to a two step random access control channel procedure being used, the request message comprises an explicit request using a physical uplink shared channel message payload. In certain embodiments, the request message comprises an implicit request using a demodulation reference signal sequence of a physical uplink shared channel of message A.

In some embodiments, the request message comprises a request to change a subcarrier spacing. In various embodiments, the request to change the subcarrier spacing comprises a plurality of bits that indicate an absolute subcarrier spacing value. In one embodiment, the request to change the subcarrier spacing comprises one bit that indicates an incremental change of a default subcarrier spacing.

In certain embodiments, the one bit comprising a '1' indicates to change the default subcarrier spacing up one value and a '0' indicates to change the default subcarrier spacing down one value. In some embodiments, the response message is received as a random access response or a message B. In various embodiments, the response message is determined based on scheduling and priority of the base station.

In one embodiment, the response message indicates a symbol offset or a slot offset for applying the waveform change, the subcarrier spacing change, or the combination thereof. In certain embodiments, the response message indicates either that the request for the waveform change, the subcarrier spacing change, or the combination thereof is approved or that a default waveform is to be used.

FIG. 7 is a flow chart diagram illustrating one embodiment of a method 700 for responding to a request for a waveform change. In some embodiments, the method 700 is performed by an apparatus, such as the network unit 104. In certain embodiments, the method 700 may be performed by a processor executing program code, for example, a microcontroller, a microprocessor, a CPU, a GPU, an auxiliary processing unit, a FPGA, or the like.

In various embodiments, the method 700 includes transmitting 702, from a base station, first information indicating configurations for a plurality of waveforms and an indication indicating that a user equipment is enabled to request a waveform change, a subcarrier spacing change, or a combination thereof. In some embodiments, the method 700 includes receiving 704 a request message from the user equipment, wherein the request message requests the waveform change, the subcarrier spacing change, or the combination thereof. In certain embodiments, the method 700 includes transmitting 706 a response message to the user equipment, wherein the response message indicates whether the request for the waveform change, the subcarrier spacing change, or the combination thereof is approved.

In certain embodiments, the plurality of waveforms comprises an uplink waveform, a downlink waveform, a multi-carrier waveform, a single-carrier waveform, or some combination thereof. In some embodiments, the method 700 further comprises transmitting second information indicating at least one waveform type that is not able to be used in a serving cell. In various embodiments, the method 700 further comprises transmitting a system information block random access channel configuration comprising a mapping between a plurality of random access channel preambles and the plurality of waveforms.

In one embodiment, the method 700 further comprises transmitting a plurality of random access channel root sequence indexes, wherein each sequence index of the plurality of random access channel root sequence indexes corresponds to a waveform of the plurality of waveforms. In certain embodiments, the method further 700 comprises transmitting path loss information corresponding to a synchronization signal block threshold, a reference signal received power threshold, a reference signal received quality threshold, a signal to interference noise ratio threshold, or a combination thereof. In some embodiments, the request message is triggered based on the synchronization signal block threshold, the reference signal received power threshold, the reference signal received quality threshold, the signal to interference noise ratio threshold, or the combination thereof.

In various embodiments, the request message comprises a selected random access channel preamble that belongs to a root sequence index or a preamble identifier group that corresponds to the waveform change, the subcarrier spacing change, or the combination thereof.

In one embodiment, in response to a two step random access control channel procedure being used, the request message comprises an explicit request using a physical uplink shared channel message payload. In certain embodiments, the request message comprises an implicit request using a demodulation reference signal sequence of a physical uplink shared channel of message A.

In some embodiments, the request message comprises a request to change a subcarrier spacing. In various embodiments, the request to change the subcarrier spacing comprises a plurality of bits that indicate an absolute subcarrier spacing value. In one embodiment, the request to change the subcarrier spacing comprises one bit that indicates an incremental change of a default subcarrier spacing.

In certain embodiments, the one bit comprising a '1' indicates to change the default subcarrier spacing up one value and a '0' indicates to change the default subcarrier spacing down one value. In some embodiments, the response message is received as a random access response or a message B. In various embodiments, the response message is determined based on scheduling and priority of the base station.

In one embodiment, the response message indicates a symbol offset or a slot offset for applying the waveform change, the subcarrier spacing change, or the combination thereof. In certain embodiments, the response message indicates either that the request for the waveform change, the subcarrier spacing change, or the combination thereof is approved or that a default waveform is to be used.

In one embodiment, a method comprises: receiving, at a user equipment, first information indicating configurations for a plurality of waveforms and an indication indicating that the user equipment is enabled to request a waveform change, a subcarrier spacing change, or a combination thereof, transmitting a request message to a base station, wherein the request message requests the waveform change, the subcarrier spacing change, or the combination thereof, and receiving a response message from the base station, wherein the response message indicates whether the request for the waveform change, the subcarrier spacing change, or the combination thereof is approved.

In certain embodiments, the plurality of waveforms comprises an uplink waveform, a downlink waveform, a multi-carrier waveform, a single-carrier waveform, or some combination thereof.

In some embodiments, the method further comprises receiving second information indicating at least one waveform type that is not able to be used in a serving cell.

In various embodiments, the method further comprises receiving a system information block random access channel configuration comprising a mapping between a plurality of random access channel preambles and the plurality of waveforms.

In one embodiment, the method further comprises receiving a plurality of random access channel root sequence indexes, wherein each sequence index of the plurality of random access channel root sequence indexes corresponds to a waveform of the plurality of waveforms.

In certain embodiments, the method further comprises receiving path loss information corresponding to a synchronization signal block threshold, a reference signal received power threshold, a reference signal received quality threshold, a signal to interference noise ratio threshold, or a combination thereof.

In some embodiments, the method further comprises triggering the request message based on the synchronization signal block threshold, the reference signal received power threshold, the reference signal received quality threshold, the signal to interference noise ratio threshold, or the combination thereof.

In various embodiments, the request message comprises a selected random access channel preamble that belongs to a root sequence index or a preamble identifier group that corresponds to the waveform change, the subcarrier spacing change, or the combination thereof.

In one embodiment, in response to a two step random access control channel procedure being used, the request message comprises an explicit request using a physical uplink shared channel message payload.

In certain embodiments, the request message comprises an implicit request using a demodulation reference signal sequence of a physical uplink shared channel of message A.

In some embodiments, the request message comprises a request to change a subcarrier spacing.

In various embodiments, the request to change the subcarrier spacing comprises a plurality of bits that indicate an absolute subcarrier spacing value.

In one embodiment, the request to change the subcarrier spacing comprises one bit that indicates an incremental change of a default subcarrier spacing.

In certain embodiments, the one bit comprising a '1' indicates to change the default subcarrier spacing up one value and a '0' indicates to change the default subcarrier spacing down one value.

In some embodiments, the response message is received as a random access response or a message B.

In various embodiments, the response message is determined based on scheduling and priority of the base station.

In one embodiment, the response message indicates a symbol offset or a slot offset for applying the waveform change, the subcarrier spacing change, or the combination thereof.

In certain embodiments, the response message indicates either that the request for the waveform change, the subcarrier spacing change, or the combination thereof is approved or that a default waveform is to be used.

In one embodiment, an apparatus comprises a user equipment, the apparatus further comprises: a receiver that receives first information indicating configurations for a plurality of waveforms and an indication indicating that the user equipment is enabled to request a waveform change, a subcarrier spacing change, or a combination thereof, and a transmitter that transmits a request message to a base station, wherein the request message requests the waveform change, the subcarrier spacing change, or the combination thereof, wherein the receiver receives a response message from the base station, wherein the response message indicates whether the request for the waveform change, the subcarrier spacing change, or the combination thereof is approved.

In certain embodiments, the plurality of waveforms comprises an uplink waveform, a downlink waveform, a multi-carrier waveform, a single-carrier waveform, or some combination thereof.

In some embodiments, the receiver receives second information indicating at least one waveform type that is not able to be used in a serving cell.

In various embodiments, the receiver receives a system information block random access channel configuration comprising a mapping between a plurality of random access channel preambles and the plurality of waveforms.

In one embodiment, the receiver receives a plurality of random access channel root sequence indexes, and each sequence index of the plurality of random access channel root sequence indexes corresponds to a waveform of the plurality of waveforms.

In certain embodiments, the receiver receives path loss information corresponding to a synchronization signal block threshold, a reference signal received power threshold, a reference signal received quality threshold, a signal to interference noise ratio threshold, or a combination thereof.

In some embodiments, the method further comprises a processor that triggers the request message based on the synchronization signal block threshold, the reference signal received power threshold, the reference signal received quality threshold, the signal to interference noise ratio threshold, or the combination thereof.

In various embodiments, the request message comprises a selected random access channel preamble that belongs to a root sequence index or a preamble identifier group that corresponds to the waveform change, the subcarrier spacing change, or the combination thereof.

In one embodiment, in response to a two step random access control channel procedure being used, the request message comprises an explicit request using a physical uplink shared channel message payload.

In certain embodiments, the request message comprises an implicit request using a demodulation reference signal sequence of a physical uplink shared channel of message A.

In some embodiments, the request message comprises a request to change a subcarrier spacing.

In various embodiments, the request to change the subcarrier spacing comprises a plurality of bits that indicate an absolute subcarrier spacing value.

In one embodiment, the request to change the subcarrier spacing comprises one bit that indicates an incremental change of a default subcarrier spacing.

In certain embodiments, the one bit comprising a '1' indicates to change the default subcarrier spacing up one value and a '0' indicates to change the default subcarrier spacing down one value.

In some embodiments, the response message is received as a random access response or a message B.

In various embodiments, the response message is determined based on scheduling and priority of the base station.

In one embodiment, the response message indicates a symbol offset or a slot offset for applying the waveform change, the subcarrier spacing change, or the combination thereof.

In certain embodiments, the response message indicates either that the request for the waveform change, the subcarrier spacing change, or the combination thereof is approved or that a default waveform is to be used.

In one embodiment, a method comprises: transmitting, from a base station, first information indicating configurations for a plurality of waveforms and an indication indicating that a user equipment is enabled to request a waveform change, a subcarrier spacing change, or a combination thereof, receiving a request message from the user equipment, wherein the request message requests the waveform change, the subcarrier spacing change, or the combination thereof, and transmitting a response message to the user equipment, wherein the response message indicates whether the request for the waveform change, the subcarrier spacing change, or the combination thereof is approved.

In certain embodiments, the plurality of waveforms comprises an uplink waveform, a downlink waveform, a multi-carrier waveform, a single-carrier waveform, or some combination thereof.

In some embodiments, the method further comprises transmitting second information indicating at least one waveform type that is not able to be used in a serving cell.

In various embodiments, the method further comprises transmitting a system information block random access channel configuration comprising a mapping between a plurality of random access channel preambles and the plurality of waveforms.

In one embodiment, the method further comprises transmitting a plurality of random access channel root sequence indexes, wherein each sequence index of the plurality of random access channel root sequence indexes corresponds to a waveform of the plurality of waveforms.

In certain embodiments, the method further comprises transmitting path loss information corresponding to a synchronization signal block threshold, a reference signal received power threshold, a reference signal received quality threshold, a signal to interference noise ratio threshold, or a combination thereof.

In some embodiments, the request message is triggered based on the synchronization signal block threshold, the reference signal received power threshold, the reference signal received quality threshold, the signal to interference noise ratio threshold, or the combination thereof.

In various embodiments, the request message comprises a selected random access channel preamble that belongs to a root sequence index or a preamble identifier group that corresponds to the waveform change, the subcarrier spacing change, or the combination thereof.

In one embodiment, in response to a two step random access control channel procedure being used, the request message comprises an explicit request using a physical uplink shared channel message payload.

In certain embodiments, the request message comprises an implicit request using a demodulation reference signal sequence of a physical uplink shared channel of message A.

In some embodiments, the request message comprises a request to change a subcarrier spacing.

In various embodiments, the request to change the subcarrier spacing comprises a plurality of bits that indicate an absolute subcarrier spacing value.

In one embodiment, the request to change the subcarrier spacing comprises one bit that indicates an incremental change of a default subcarrier spacing.

In certain embodiments, the one bit comprising a '1' indicates to change the default subcarrier spacing up one value and a '0' indicates to change the default subcarrier spacing down one value.

In some embodiments, the response message is received as a random access response or a message B.

In various embodiments, the response message is determined based on scheduling and priority of the base station.

In one embodiment, the response message indicates a symbol offset or a slot offset for applying the waveform change, the subcarrier spacing change, or the combination thereof.

In certain embodiments, the response message indicates either that the request for the waveform change, the subcarrier spacing change, or the combination thereof is approved or that a default waveform is to be used.

In one embodiment, an apparatus comprises a base station, the apparatus further comprises: a transmitter that transmits first information indicating configurations for a plurality of waveforms and an indication indicating that a user equipment is enabled to request a waveform change, a subcarrier spacing change, or a combination thereof, and a receiver that receives a request message from the user equipment, wherein the request message requests the waveform change, the subcarrier spacing change, or the combination thereof, wherein the transmitter transmits a response message to the user equipment, wherein the response message indicates whether the request for the waveform change, the subcarrier spacing change, or the combination thereof is approved.

In certain embodiments, the plurality of waveforms comprises an uplink waveform, a downlink waveform, a multi-carrier waveform, a single-carrier waveform, or some combination thereof.

In some embodiments, the transmitter transmits second information indicating at least one waveform type that is not able to be used in a serving cell.

In various embodiments, the transmitter transmits a system information block random access channel configuration comprising a mapping between a plurality of random access channel preambles and the plurality of waveforms.

In one embodiment, the transmitter transmits a plurality of random access channel root sequence indexes, wherein each sequence index of the plurality of random access channel root sequence indexes corresponds to a waveform of the plurality of waveforms.

In certain embodiments, the transmitter transmits path loss information corresponding to a synchronization signal block threshold, a reference signal received power threshold, a reference signal received quality threshold, a signal to interference noise ratio threshold, or a combination thereof.

In some embodiments, the request message is triggered based on the synchronization signal block threshold, the reference signal received power threshold, the reference signal received quality threshold, the signal to interference noise ratio threshold, or the combination thereof.

In various embodiments, the request message comprises a selected random access channel preamble that belongs to a root sequence index or a preamble identifier group that corresponds to the waveform change, the subcarrier spacing change, or the combination thereof.

In one embodiment, in response to a two step random access control channel procedure being used, the request message comprises an explicit request using a physical uplink shared channel message payload.

In certain embodiments, the request message comprises an implicit request using a demodulation reference signal sequence of a physical uplink shared channel of message A.

In some embodiments, the request message comprises a request to change a subcarrier spacing.

In various embodiments, the request to change the subcarrier spacing comprises a plurality of bits that indicate an absolute subcarrier spacing value.

In one embodiment, the request to change the subcarrier spacing comprises one bit that indicates an incremental change of a default subcarrier spacing.

In certain embodiments, the one bit comprising a '1' indicates to change the default subcarrier spacing up one value and a '0' indicates to change the default subcarrier spacing down one value.

In some embodiments, the response message is received as a random access response or a message B.

In various embodiments, the response message is determined based on scheduling and priority of the base station.

In one embodiment, the response message indicates a symbol offset or a slot offset for applying the waveform change, the subcarrier spacing change, or the combination thereof.

In certain embodiments, the response message indicates either that the request for the waveform change, the subcarrier spacing change, or the combination thereof is approved or that a default waveform is to be used.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by user equipment (UE), the method comprising:

receiving first information indicating configuration for a plurality of waveforms and an indication indicating that the UE is enabled to request a waveform change;

receiving a system information block (SIB) random access channel (RACH) configuration comprising a mapping between a plurality of RACH preambles and the plurality of waveforms;

transmitting a request message to a base station, wherein the request message comprises a RACH preamble of the plurality of RACH preambles corresponding to a waveform of the plurality of waveforms from the mapping in the SIB RACH configuration and requests the waveform change; and receiving a response message from the base station, wherein the response message indicates whether the request for the waveform change is approved.

2. The method of claim 1, further comprising receiving a plurality of RACH root sequence indexes, wherein each sequence index of the plurality of RACH root sequence indexes corresponds to a corresponding waveform of the plurality of waveforms.

3. The method of claim 1, further comprising receiving path loss information corresponding to one or more of a synchronization signal block (SSB) threshold, a reference signal received power threshold, a reference signal received quality threshold, or a signal to interference noise ratio threshold and triggering the request message based on the one or more of the synchronization signal block threshold, the reference signal received power threshold, the reference signal received quality threshold, or the signal to interference noise ratio threshold.

4. The method of claim 1, wherein the request message comprises the RACH preamble that belongs to a root sequence index or a preamble identifier group that corresponds to the waveform change.

5. The method of claim 1, wherein, in response to a two step RACH procedure being used, the request message comprises an explicit request using a physical uplink shared channel (PUSCH) message payload.

6. The method of claim 1, wherein the request message comprises an implicit request using a demodulation reference signal sequence of a physical uplink shared channel of message A.

7. The method of claim 1, wherein the response message is received as a random access response or a message B.

8. The method of claim 1, wherein the response message indicates a symbol offset or a slot offset for applying the waveform change.

9. The method of claim 1, wherein the response message indicates either that the request for the waveform change is approved or that a default waveform is to be used.

10. A user equipment (UE), comprising:

at least one memory; and at least one processor coupled with the at least one memory and configured to cause the UE to:

receive first information indicating configurations for a plurality of waveforms and an indication indicating that the UE is enabled to request a waveform change;

receive a system information block (SIB) random access channel (RACH) configuration comprising a mapping between a plurality of RACH preambles and the plurality of waveforms;

transmit a request message to a base station, wherein the request message comprises a RACH preamble of the plurality of RACH preambles corresponding to a waveform of the plurality of waveforms from the mapping in the SIB RACH configuration and requests the waveform change; and receive a response message from the base station, wherein the response message indicates whether the request for the waveform change is approved.

11. A base station, comprising:

at least one memory; and at least one processor coupled with the at least one memory and configured to cause the base station to:

transmit first information indicating configurations for a plurality of waveforms and an indication indicating that a user equipment (UE) is enabled to request one or more of a waveform change;

transmit a system information block (SIB) random access channel (RACH) configuration comprising a mapping between a plurality of RACH preamble and the plurality of waveforms;

receive a request message from the UE, wherein the request message comprises a RACH preamble of the plurality of RACH preambles corresponding to a waveform of the plurality of waveforms from the mapping in the SIB RACH configuration and requests for the waveform change is approved.

12. The base station of claim 11, wherein the at least one processor is configured to cause the base station to transmit a plurality of RACH root sequence indexes, wherein each sequence index of the plurality of RACH root sequence indexes corresponds to a corresponding waveform of the plurality of waveforms.

13. The base station of claim 11, wherein the at least one processor is configured to cause the base station to transmit path loss information corresponding to a synchronization signal block (SSB) threshold, a reference signal received power threshold, a reference signal received quality threshold, or a signal to interference noise ratio threshold and triggering the request message based on the one or more of the synchronization signal block threshold, the reference signal received power threshold, the reference signal received quality threshold, or the signal to interference noise ratio threshold.

14. The base station of claim 11, wherein the request message comprises the RACH preamble that belongs to a root sequence index or a preamble identifier group that corresponds to the waveform change.

15. The base station of claim 11, wherein, in response to a two step RACH procedure being used, the request message comprises an explicit request using a physical uplink shared channel (PUSCH) message payload.

16. The base station of claim 11, wherein the request message comprises an implicit request using a demodulation reference signal sequence of a physical uplink shared channel of message A.

17. A processor for wireless communication, comprising:

at least one controller coupled with at least one memory and configured to cause the processor to:

receive first information indicating configurations for a plurality of waveforms and an indication indicating that the processor is enabled to request a waveform;

receive a system information block (SIB) random access channel (RACH) configuration comprising a mapping between a plurality of RACH preambles and the plurality of waveforms;

transmit a request message to a base station, wherein the request message comprises a RACH preamble of the plurality of RACH preambles corresponding to a waveform of the plurality of waveforms from the mapping in the SIB RACH configuration and requests the waveform change; and receive a response message from the base station, wherein the response message indicates whether the request for the waveform change is approved.

18. The processor of claim 17, wherein the at least one controller is configured to cause the processor to receive a plurality of RACH root sequence indexes, wherein each sequence index of the plurality of RACH root sequence indexes corresponds to a corresponding waveform of the plurality of waveforms.

\* \* \* \* \*